(12) United States Patent
Ukuda et al.

(10) Patent No.: US 11,346,985 B2
(45) Date of Patent: May 31, 2022

(54) CURED PRODUCT, AND OPTICAL ELEMENT, DIFFRACTIVE OPTICAL ELEMENT, OPTICAL APPARATUS, AND IMAGING DEVICE USING THE CURED PRODUCT

(71) Applicant: CANON KABUSHIKI KAISHA, Tokyo (JP)

(72) Inventors: Hideo Ukuda, Yokohama (JP); Emi Oishi, Kawasaki (JP); Yuuta Tsuruki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 464 days.

(21) Appl. No.: 16/407,690

(22) Filed: May 9, 2019

(65) Prior Publication Data

US 2019/0346597 A1    Nov. 14, 2019

(30) Foreign Application Priority Data

May 14, 2018 (JP) .............................. JP2018-093252
May 14, 2018 (JP) .............................. JP2018-093253
Apr. 10, 2019 (JP) .............................. JP2019-074992

(51) Int. Cl.
| | | |
|---|---|---|
| *C08K 3/24* | (2006.01) | |
| *C08K 3/22* | (2006.01) | |
| *C08K 3/36* | (2006.01) | |
| *C08F 283/01* | (2006.01) | |
| *G02B 1/04* | (2006.01) | |
| *G02B 5/18* | (2006.01) | |
| *B32B 27/08* | (2006.01) | |
| *B32B 27/20* | (2006.01) | |
| *B32B 27/30* | (2006.01) | |
| *G02B 27/00* | (2006.01) | |

(52) U.S. Cl.
CPC ............ *G02B 5/1866* (2013.01); *B32B 27/08* (2013.01); *B32B 27/20* (2013.01); *B32B 27/308* (2013.01); *C08K 3/22* (2013.01); *C08K 3/24* (2013.01); *C08K 3/36* (2013.01); *G02B 1/04* (2013.01); *G02B 5/1814* (2013.01); *G02B 5/1852* (2013.01); *G02B 27/0037* (2013.01); *B32B 2264/102* (2013.01); *B32B 2264/1024* (2020.08); *B32B 2307/418* (2013.01); *B32B 2551/00* (2013.01); *C08K 2003/2244* (2013.01); *C08K 2201/005* (2013.01); *C08K 2201/011* (2013.01)

(58) Field of Classification Search
None
See application file for complete search history.

(56) References Cited

U.S. PATENT DOCUMENTS

2008/0187732 A1* 8/2008 Shinohara ............ C01G 23/003
                                                        428/212
2010/0331442 A1   12/2010 Jones

FOREIGN PATENT DOCUMENTS

| JP | 2004-331744 A | 11/2004 |
| JP | 2009-46658 A  | 3/2009  |
| JP | 2009-197217 A | 9/2009  |

* cited by examiner

*Primary Examiner* — Sheeba Ahmed
(74) *Attorney, Agent, or Firm* — Canon U.S.A., Inc., IP Division

(57) ABSTRACT

A cured product contains a dispersant, inorganic particles, and a resin that is a product of polymerization or copolymerization of a curable resin. The dispersant contains a compound represented by a formula R—X, wherein R represents a group having an acryloyloxy group or a methacryloyloxy group at an end of the molecule thereof, and X represents a carboxy group. The dispersant content is 10 parts by volume to 20 parts by volume relative to 100 parts by volume of the cured product. The curable resin contains at least one monomer having an N number of polymerizable reactive group, wherein N represents an integer of 2 or more. The proportion of the at least one monomer is 25 parts by volume to 76 parts by volume relative to 100 parts by volume of the cured product.

19 Claims, 7 Drawing Sheets

600

CURED PRODUCT, AND OPTICAL ELEMENT, DIFFRACTIVE OPTICAL ELEMENT, OPTICAL APPARATUS, AND IMAGING DEVICE USING THE CURED PRODUCT

BACKGROUND OF THE INVENTION

Field of the Invention

The present disclosure relates to a cured product used for lenses and other optical elements of imaging apparatuses, such as still cameras and video cameras.

Description of the Related Art

Organic/inorganic composite materials having features of both organic materials and inorganic materials exhibit physical properties that either the inorganic materials or the organic materials do not have and are, therefore, expected to be used in a variety of fields. Particularly in the field of optics, nanocomposite materials produced by combining organic materials and inorganic materials on the order of nanometers are expected as optical materials. It has been known that physical properties that cannot be realized by only organic materials are achieved by dispersing inorganic particles having a particle size on the order of nanometers in a resin, which is an organic material.

In particular, cured produces of a resin composition in which particles of an inorganic material having a high refractive index, such as zirconium oxide or titanium oxide, are dispersed are as workable as those of known curable resins and allow favorable refraction of light. Accordingly, use of such a cured product for optical elements is expected to miniaturize the optical element and improve the performance of the optical element.

For example, Japanese Patent Laid-Open No. 2009-46658 discloses an optical element including a cured product (resin layer) of a resin composition in which inorganic particles, which are surface-treated to prevent aggregation thereof, are dispersed in a resin. However, the resin of the known diffractive optical element often absorb water. Water absorption of the resin may vary the optical properties of the optical element.

SUMMARY OF THE INVENTION

According to an aspect of the present disclosure, there is provided a cured product containing a dispersant, inorganic particles, and a resin that is a product of polymerization or copolymerization of a curable resin. The dispersant contains a compound represented by a formula R—X, wherein R represents a group having an acryloyloxy group or a methacryloyloxy group at an end of the molecule thereof, and X represents a carboxy group. The dispersant content is 10 parts by volume to 20 parts by volume relative to 100 parts by volume of the cured product. The curable resin contains at least one monomer having an N number of polymerizable reactive groups (N is an integer of 2 or more), and the proportion of the at least one monomer is 25 parts by volume to 76 parts by volume relative to 100 parts by volume of the cured product.

Further features of the present disclosure will become apparent from the following description of exemplary embodiments with reference to the attached drawings.

DESCRIPTION OF THE EMBODIMENTS

Figure 1:
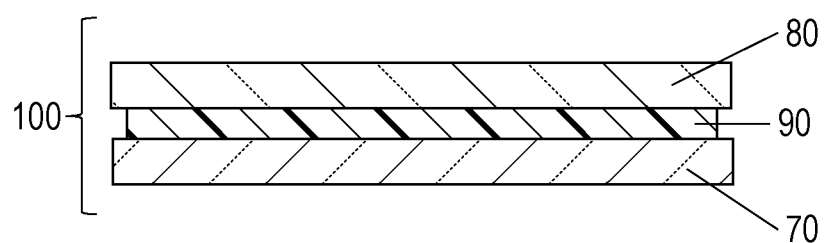
FIG. 1 is a schematic view of an optical element according to an embodiment of the present disclosure.

Embodiments of the present disclosure will now be described in detail.

First Embodiment

Cured Product

The cured product according to a first embodiment does not vary much in volume in high-temperature high-humidity environments and is thus suitable for optical use. The cured product of the present embodiment contains a dispersant, inorganic particles, and a resin that is a product of polymerization or copolymerization of a curable resin. The cured product is produced by curing a resin composition to polymerize or copolymerize the curable resin. The term "resin composition" used herein refers to the material to be cured, consisting of raw materials of the cured product.

Curable Resin

The curable resin is liquid at room temperature and can be cured by a radical production mechanism using a polymerization initiator, such as a photopolymerization initiator or a thermal polymerization initiator.

The curable resin used herein may be, but is not limited to, an acrylic resin, a methacrylic resin, a vinyl resin, or an epoxy resin. The curable resin may be a single component or a mixture of two or more curable resins. In an embodiment, a (meth)acrylic resin may be used because of the favorable optical properties thereof. For the (meth)acrylic resin, a monomer or an oligomer of a compound having a polymerizable reactive group, such as an acrylate group or a methacrylate group, may be used. Beneficially, the monomer or the oligomer is miscible with the solvent or medium in which the inorganic particles are dispersed and the dispersant. The monomer is an organic compound containing an unsaturated group having one or more double bonds or triple bonds and is not otherwise limited. Examples of the monomer or oligomer containing one or more unsaturated groups include monofunctional acrylates and methacrylates, such as 1,4-divinylcyclohexane, 1,4-cyclohexanedimethanol divinyl ether, 4,4-dimethylhept-1-en-6-yne, divinylbenzene, 1,6-divinylnaphthalene, N-vinylpyrrolidone, N-vinylcaprolactam, ethoxylated bisphenol A divinyl ether, propoxylated bisphenol A divinyl ether, polyethylene glycol mono(meth)acrylate, polypropylene glycol mono(meth)acrylate, and phenoxyethyl (meth)acrylate; and polyethylene glycol di(meth)acrylate, polypropylene glycol di(meth)acrylate, trimethylolethane tri(meth)acrylate, neopentyl glycol di(meth)acrylate, pentaerythritol tri(meth)acrylate, pentaerythritol tetra(meth)acrylate, dipentaerythritol hexa(meth)acrylate, hexanediol di(meth)acrylate, and tri(acryloyloxyethyl) isocyanurate.

The curable resin used in the present embodiment contains at least one monomer having an N number of polymerizable reactive groups (N is an integer of 2 or more).

The proportion of the at least one monomer is 25 parts by volume to 76 parts by volume relative to 100 parts by volume of the cured product. When the proportion of the monomer are in such ranges with the dispersant content within a range described later herein, the resulting cured product is unlikely to scatter light and exhibits a reduced hydroscopic volume expansion.

The present inventors used the cured product of the resin composition disclosed in Japanese Patent Laid-Open No. 2009-46658 for an optical element. When the optical element was allowed to stand in a high-temperature high-humidity environment, the optical properties of the optical element were degraded. The mechanism of this is as described below. Since the dispersant contained in the resin composition has a hydrophilic group (such as hydroxy, carboxy, or amino), the dispersant remaining without being adsorbed to the inorganic particles binds to the water in the air. The dispersant bound to water causes the cured product of the resin composition to absorb water, resulting in an increased volume. This volume increase, or volume expansion, of the cured product of the resin composition causes the optical path length of the optical element to deviate from the intended optical path length, thus affecting the light-focusing property of the optical element. This is the reason for the degradation of the optical properties.

In contrast, in the cured product of the present embodiment, a cured component formed of the monomer(s) acts to form crosslinks in a state where the inorganic particles are favorably dispersed in the presence of the dispersant. Thus, the volume expansion of the cured product is reduced. However, if the proportion of the monomer(s) is less than 25 parts by volume relative to 100 parts by volume of the cured product, the workability of the cured product is poor. If the proportion of the monomer(s) is more than 76 parts by volume, the content of the inorganic particles in the cured product is relatively reduced, and the cured product does not have satisfactory optical properties. In some embodiments, the proportion of the monomer(s) relative to the cured product is 25 part by volume to 30 parts by volume.

The molecular weight of the monomer(s) may be in a range of 71×N to 160×N. N represents the number of polymerizable reactive groups of the monomer and is an integer of 2 or more. When the monomers have a molecular weight in this range, the hygroscopic volume expansion of the cured product can be reduced. If the molecular weight of a monomer is higher than 160×N, the crosslinking component in the monomer is relatively reduced, and, thus, the monomer may not function effectively to reduce the hydroscopic volume expansion of the cured product. The value of 71×N is the minimum unit of acrylates. There are no acrylates having a molecular weight lower than 71×N.

Examples of the monomer having a molecular weight in the above range include tri(acryloyloxyethyl) isocyanurate (Number of polymerizable reactive group N: 3, molecular weight: 375 (within the range of 71×N to 160×N), dipentaerythritol hexa(meth)acrylate (number of polymerizable reactive group N: 6, molecular weight: 578 (within the range of 71×N to 160×N), tetraethylene glycol diacrylate (number of polymerizable reactive group N: 2, molecular weight: 302 (within the range of 71×N to 160×N), pentaerythritol tetra(meth)acrylate (number of polymerizable reactive group N: 3, molecular weight: 298 (within the range of 71×N to 160×N), and 2-hydroxy-3-acryloyloxypropyl methacrylate (number of polymerizable reactive groups N: 2, molecular weight: 241 (within the range of 71×N to 160×N).

In some embodiments, such monomers may include a monomer containing a hydroxy group (—OH). The monomer containing a hydroxy group helps the dispersant to disperse the inorganic particles in the resin composition. Consequently, light scattering by the cured product of the resin composition is reduced. The content of the monomer containing a hydroxy group may be 4.0 parts by volume to 76 parts by volume relative to 100 parts by volume of the cured product from the viewpoint of helping disperse the inorganic particles. In some embodiments, the content of such a monomer in the resin composition may be 4.0 parts by volume to 12 parts by volume. The monomer containing a hydroxy group may be pentaerythritol tetra(meth)acrylate or 2-hydroxy-3-acryloyloxypropyl methacrylate.

Inorganic Particles

In the cured product of the present embodiment, the inorganic particles act to control the dispersion of the refractive index of the cured product depending on wavelength (hereinafter referred to as wavelength-dependent dispersion).

The particle size of the inorganic particles is small enough to allow the cured product to appropriately scatter or transmit light. In some embodiments, the average particle size of the inorganic particles is 3 nm to 20 nm from the viewpoint of avoiding affecting light scattering and transmission. If the particle size, including that of aggregates of the particles, exceeds 20 nm, light scattering may be excessively increased. In contrast, if the particle size is less than 3 nm, the particles have a larger surface energy and may aggregate together, becoming difficult to disperse. If the resin composition, which is the material to be cured and consisting of raw materials of the cured product, contains particles having a particle size of more than 20 nm, such particles may be removed by centrifugation, ultrafiltration, or the like. The removal of such particles may be performed by removing the solvent or medium from the dispersion liquid containing the particles. The term "average particle size" used herein refers to a number average primary particle size. The average particle size of the inorganic particles may be measured by, for example, dynamic light scattering using a particle size distribution analyzer, such as ELSZ-2000ZS (manufactured by Otsuka Electronics).

The inorganic particle content in the cured product may be κ parts by volume to 25 parts by volume relative to 100 parts by volume of the cured product. When the inorganic particle content is in this range, the resin composition to be cured has a low viscosity and is accordingly workable. The resulting cured product has favorable optical properties, such as a high refractive index and a high transparency. On the other hand, if the inorganic particle content in the cured product is less than 5 parts by volume, the light scattering by the cured product may increase, and, accordingly, the transparency of the cured product may decrease. If the inorganic particle content is higher than 25 parts by volume, the viscosity of the resin composition to be cured into the cured product may increase, and, accordingly, it may become difficult to form the resin composition into a desired shape.

The material of the inorganic particles may be selected from among a variety of metal oxides according to the desired optical properties. Exemplary materials of the inorganic particles that may be used in the present embodiment include silicon oxide (SiO$_2$), titanium oxide (TiO$_2$), strontium titanate (SrTiO$_3$), zirconium oxide (ZrO$_2$), hafnium oxide (HfO$_2$), aluminum oxide (Al$_2$O$_3$), indium oxide (In$_2$O$_3$), tin oxide (SnO$_2$), indium tin oxide (ITO), antimony-doped tin oxide (ATO), and zinc oxide (ZnO). Examples of the material exhibiting a high refractive index and a small wavelength-dependent dispersion (a high Abbe number) include zirconium oxide, hafnium oxide, and aluminum oxide. Zirconium oxide is inexpensive and can impart a high refractive index to the cured product even in a small amount. Therefore, in some embodiments, zirconium oxide may be used. In contrast, if a large wavelength-dependent dispersion is desired, the material of the inorganic particles may be selected from among titanium oxide, strontium titanate, indium oxide, tin oxide, indium tin oxide, antimony-doped tin oxide, and zinc oxide.

Dispersant

The dispersant used in the present embodiment acts to treat the surfaces of the inorganic particles and to uniformly disperse the inorganic particles in the cured product.

The dispersant is represented by the following formula (1):

R—X  (1)

wherein R represents a group having an acryloyloxy group or a methacryloyloxy group at an end of the molecule thereof, and X represents a carboxy group.

Hence, the molecule of the dispersant used in the present embodiment includes an acryloyloxy group or a methacryloyloxy group at an end thereof and a carboxy group (—COOH) at the opposite end. This structure enables the inorganic particles to uniformly disperse in the cured product. This is because the carboxy group is hydrophilic and has an affinity with the surfaces of the inorganic particles. In some embodiments, the dispersant may be β-carboxyethyl acrylate or ω-carboxypolycaprolactone monoacrylate represented by the following formula (2) where n=2:

CH$_2$=CH—(COO—C$_5$H$_{10}$)$_n$—COOH  (2)

ω-Carboxypolycaprolactone monoacrylate has a molecular chain compatible with acrylic and methacrylic resins and the like and is thus unlikely to cause light to scatter. In addition, the use of ω-carboxypolycaprolactone monoacrylate, which has high affinity with other constituents, allows the resin composition that is the material of the cured product to have a low viscosity.

The dispersant content is 10 parts by volume to 20 parts by volume relative to 100 parts by volume of the cured product. When the dispersant content is in such a range, the cured product is unlikely to scatter light, and hygroscopic volume expansion of the cured product is reduced. In contrast, if the dispersant content is lower than 10 parts by volume relative to 100 parts by volume of the cured product, the inorganic particles aggregate together, increasing light scattering. If the dispersant content is higher than 20 parts by volume, the hydroscopic volume expansion increases, and the refractive index of the cured product varies from the intended value. In addition, in some embodiments, the proportion of the dispersant to 100 parts by volume of the inorganic particles may be 80 parts by volume to 130 parts by volume.

Dispersion Solvent

A dispersion solvent is used to dissolve the monomer(s) or oligomer(s) of the uncured resin composition or to enable the inorganic particles to be surface-treated with the dispersant.

Examples of the dispersion solvent include, but are not limited to, aromatic hydrocarbons, such as toluene, benzene, and xylene; alcohols, such as methanol, ethanol, and isopropanol; alicyclic hydrocarbons, such as cyclohexane; acetic acid esters, such as ethyl acetate and butyl acetate; ketones, such as acetone and methyl ethyl ketone; amide-based solvents, such as dimethylformamide (DMF), dimethylacetamide (DMAc), and N-methylpyrrolidone (NMP); aliphatic hydrocarbons, such as hexane and octane; ethers, such as diethyl ether and butyl carbitol; halogenated hydrocarbons, such as dichloromethane and carbon tetrachloride. The dispersion solvent may be selected according to the affinity with the inorganic particles and the dispersant. The dispersion solvent may be a single compound, or two or more compounds may be used in combination, provided that the dispersion solvent does not adversely affect dispersion.

Polymerization Initiator

A polymerization initiator may be used according to the curing conditions (irradiation wavelength, irradiation dose). For example, a photopolymerization initiator may be used, and examples thereof include 2-benzyl-2-dimethylamino-1-(4-morpholinophenyl)-1-butanone, 1-hydroxycyclohexyl phenyl ketone, bis(2,4,6-trimethylbenzoyl)phenylphosphine oxide, 4-phenylbenzophenone, 4-phenoxybenzophenone, 4,4'-diphenylbenzophenone, and 4,4'-diphenoxybenzophenone. In some embodiments, 1-hydroxycyclohexylphenyl ketone may be used from the viewpoint of improving the transparency of the cured product. The photopolymerization initiator content in the resin composition to be cured into the cured product depends on the content of fine particles capable of absorbing visible light but may be 0.01 parts by mass to 10.00 parts by mass relative to 100 parts by mass of the resin composition. When the photopolymerization initiator content is in such a range, the resin composition can be formed into a desired shape and can prevent the resulting cured product from being colored and thus degraded in terms of appearance and transparency. The photopolymerization initiator may be a single compound selected according to the reactivity with the monomers or oligomers or the like and the wavelength of irradiation light, or two or more compounds may be used in combination.

Preparation of Resin Composition

The resin composition to be cured into the cured product may be prepared as described below.

First, a dispersant is added into a dispersion solution containing the inorganic particles that are not surface-treated so that the dispersant can be adsorbed onto the surfaces of the inorganic particles.

The inorganic particles may be particles of any of the above-mentioned materials, such as zirconium oxide particles or silicon oxide particles. The solvent in the dispersion solution may be methanol. For the adsorption onto the surfaces of the particles, supersonic waves may be used. Application of supersonic waves helps replace the methanol and a stabilizing agent that are adsorbed onto the surfaces of the particles with the dispersant.

After a period of time enough to replace the solvent (methanol) and the stabilizing agent with the dispersant has passed, adequate amounts of photopolymerizableqj monomer(s) or oligomer(s) and a photopolymerization initiator are dissolved in the dispersion solution. The adequate amounts are calculated on the basis of the inorganic particle content in the dispersion solution.

The dispersion solution may be subjected to filtration to remove aggregates of particles, if necessary. After ensuring that the particles are appropriately dispersed without settling or the like, the solvent is removed by, for example, using an evaporator. The degree of vacuum for this operation may be adjusted according to the boiling point of the solvent, the amount of residual solvent, and the like. Rapid evaporation and removal of the solvent may increase the degree of aggregation of the particles and thus adversely affect the dispersion. When the solvent is removed under reduced pressure, the dispersion solution may be heated to a temperature not affecting the dispersion of the particles. Thus, the resin composition is prepared.

The resulting resin composition may contain residual solvent remaining therein that has not been removed. If the residual solvent content is more than 0.1 part by mass relative to 100 parts by mass of the resin composition, the solvent may promote the movement of the particles during the curing with light, thus increasing refractive index gradient (GI) and light scattering. It is therefore beneficial to control the residual solvent content to 0.1 part by mass or less.

Optical Element

FIG. 1 is a schematic view of an optical element according to an embodiment of the present disclosure.

The optical element shown in FIG. 1 is a cemented lens 100 including a first substrate 70, a resin layer 90, and a second substrate 80 that are stacked in this order in an optical axis direction. The resin layer 90 is the cured product disclosed herein.

Although the surfaces of the first substrate 70 and the second substrate 80 are flat in the embodiment shown in FIG. 1, the surfaces may be flat, spherical, or aspherical. The first substrate 70 and the second substrate 80 may be made of a transparent material, such as glass or plastic.

The optical element may be produced as described below, but the production process is not limited to the following.

Figure 2A:
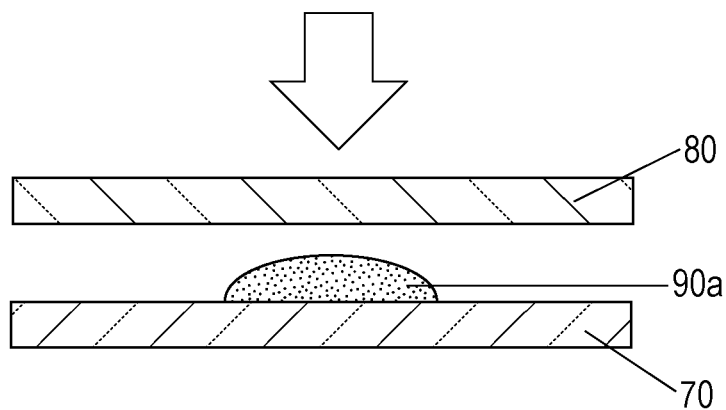
FIGS. 2A to 2C are illustrative schematic representations of a process for producing an optical element according to an embodiment of the present disclosure.
Figure 2B:
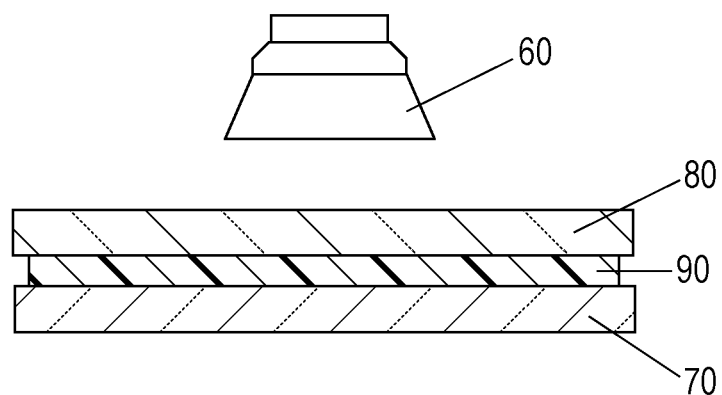
Figure 2C:
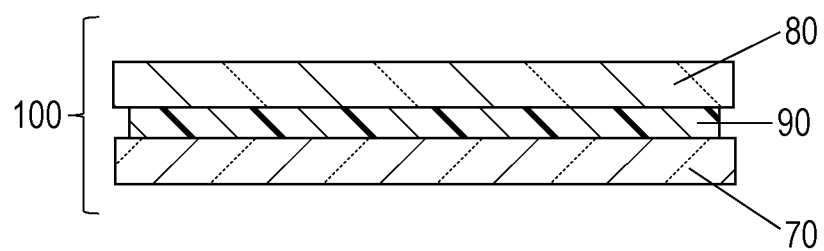

FIGS. 2A to 2C are illustrative schematic representations of a process for producing an optical element according to an embodiment of the present disclosure. A process for producing the cemented lens 100 will now be described with reference to FIGS. 2A to 2C.

First, an appropriate amount of an uncured resin composition 90a is introduced into the space between the first substrate 70 and the second substrate 80. The uncured resin composition 90a may be applied by, for example, being dropped from a dispenser (not shown).

Subsequently, the uncured resin composition 90a is pressed to spread between the first substrate 70 and the second substrate 80 until the thickness thereof comes to a desired value and the resin composition covers the optically effective portion, as shown in FIG. 2A. For introducing the resin composition, heat or pressure may be applied to the first substrate 70 or the second substrate 80, if necessary.

Then, optical or heat energy is applied to the uncured resin composition 90a so that the resin composition can be cured to form a resin layer 90. In the embodiment shown in FIG. 2B, a UV light source 60 applies optical energy to the resin composition 90a. At this time, heat may be applied together with the optical energy to promote the curing reaction of the uncured resin composition 90a. Thus, the cemented lens 100 is completed as shown in FIG. 2C.

Diffractive Optical Element

Figure 3:
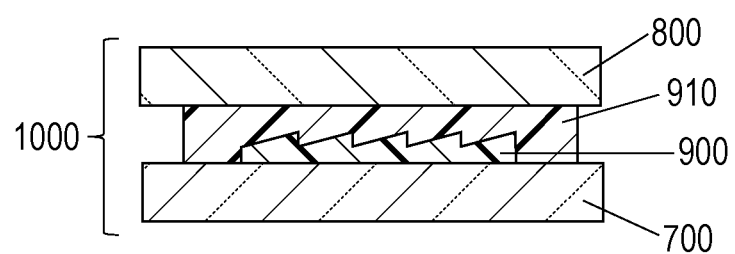
FIG. 3 is a schematic view of a diffractive optical element according to an embodiment of the present disclosure.

FIG. 3 is a schematic view of a diffractive optical element according to an embodiment of the present disclosure.

The diffractive optical element 1000 shown in FIG. 3 includes a first substrate 700, a first resin layer 900 having a shape of a diffraction grating, a second resin layer 910, and a second substrate 800 that are stacked in this order in an optical axis direction. The second resin layer 910 is the cured product disclosed herein.

Although the surfaces of the first substrate 700 and the second substrate 800 are flat in the embodiment shown in FIG. 3, the surfaces may be flat, spherical, or aspherical. The first substrate 700 and the second substrate 800 may be made of a transparent material, such as glass or plastic.

The first resin layer 900 is a cured product of a first resin containing first inorganic particles. The second resin layer 910 is a cured product of a second resin containing second inorganic particles. The second resin layer 910 has a shape of a diffraction grating corresponding to the shape of the diffraction grating of the first resin layer 900 so as to have no gap therebetween.

In this structure, the first resin layer has a refractive index nd1 and an Abbe number ν1, and the second resin layer has a refractive index nd2 and an Abbe number ν2, and the first resin layer 900 and the second resin layer 910 satisfy the relationships nd1<nd2 and ν1<ν2. This implies that the first resin layer 900 exhibits smaller refraction and larger dispersion than the second resin layer 910. Hence, the second resin layer 910 causes larger refraction and smaller dispersion than the first resin layer 900. When the first resin layer 900 and the second resin layer 910 satisfy such relationships, the diffractive optical element exhibits high reflection properties and functions for chromatic aberration correction.

The diffractive optical element may be produced as described below. However, the production process is not limited to the following.

FIGS. 4A to 4D are illustrative schematic representations of a process for producing a diffractive optical element according to an embodiment of the present disclosure. A process for producing a diffractive optical element 1000 will now be described with reference to FIGS. 4A to 4D.

First, an appropriate amount of an uncured resin composition 900a is introduced into the space between a mold 12 having a desired shape and the first substrate 700. The resin composition 900a is designed so that the first resin layer 900 can exhibit smaller refraction and larger dispersion than the second resin layer 910. The first substrate 700 and the mold 12 are held by a releasing jig 15. Subsequently, the mold 12 and the first substrate 700 are moved to press and spread the uncured resin composition 900a until the resin composition 900a has a desired thickness and covers the optically effective portion. For introducing the resin composition, heat or pressure may be applied to the mold 12 and/or the first substrate 700, if necessary. Subsequently, the uncured resin composition 900a is cured by optical or heat energy application. In the embodiment shown in FIG. 4A, a UV light source 60 applies optical energy to the resin composition. At this time, heat may be applied together with the optical energy to promote the curing reaction of the uncured resin composition 900a.

Figure 4A:
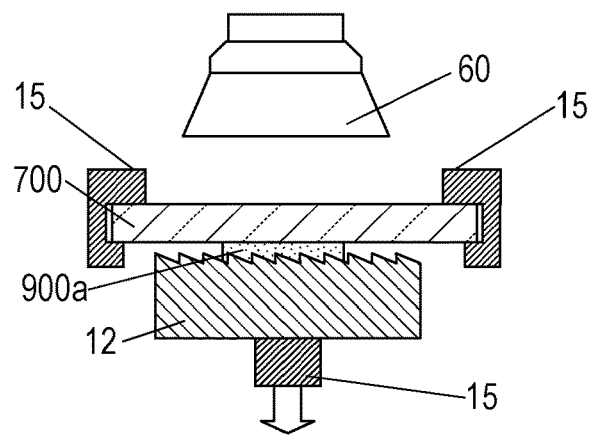
FIGS. 4A to 4D are illustrative schematic representations of a process for producing a diffractive optical element according to an embodiment of the present disclosure.
Figure 4B:
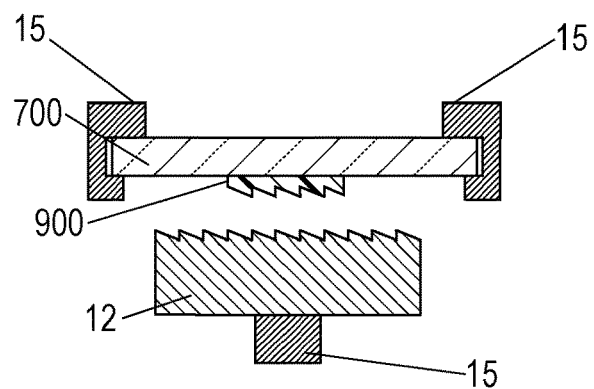

Subsequently, the releasing jig 15 is moved to remove the mold 12, as shown in FIG. 4B, to obtain a first resin layer 900 made of the cured product of the resin composition.

Figure 4C:
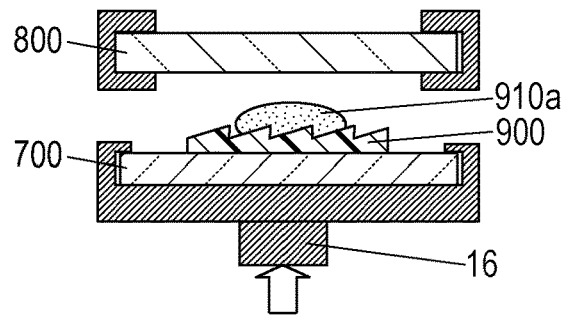

Then, the first substrate 700 having the first resin layer 900 is held by a forming jig 16, as shown in FIG. 4C. Subsequently, an appropriate amount of the uncured resin composition 910a is introduced into a space between the shape of the diffraction grating of the first resin layer 900 and the second substrate 800.

Figure 4D:
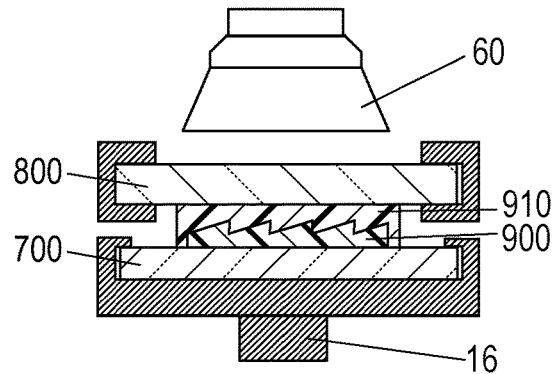

Then, the uncured resin composition 910a is pressed to spread until the resin composition has a desired thickness and covers the optically effective portion, as shown in FIG. 4D. Furthermore, optical or heat energy is applied from a light source 60 to the uncured resin composition 910a so that the resin composition can be cured to form a second resin layer 910. After the formation of the second resin layer 910, the second substrate 800 may be removed.

Imaging Apparatus

Figure 7:
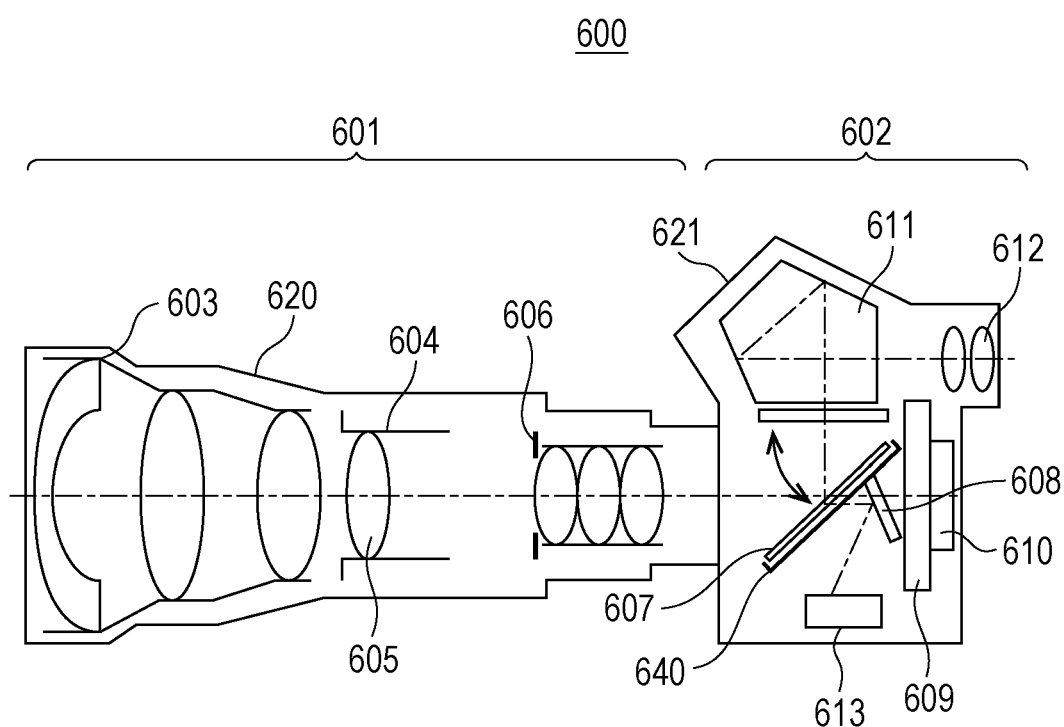
FIG. 7 is a schematic diagram of an optical apparatus according to an embodiment of the present disclosure.

FIG. 7 shows a single-lens reflex digital camera that is an embodiment of the imaging apparatus disclosed herein. Although in FIG. 7, a camera body 602 and a lens barrel 601 that is an optical apparatus are combined, the lens barrel 601 is separable from the camera body 602 and is thus an interchangeable lens.

Light from a subject is picked up through an optical system including a plurality of lenses including lens 603 and lens 605, arranged on the optical axis of the photographing optical system in the housing 620 of the lens barrel 601. The (diffractive) optical system disclosed herein may be used as the lenses 603 and 605.

The lens 605 is held by an inner tube 604 so as to be movable relative to the outer tube of the lens barrel 601 for focusing and zooming.

During observation of the subject before photographing, light from the subject is reflected at a main mirror 607 in the housing 621 of the camera body and transmitted through a prism 611, so that an image to be photographed is projected to the photographer through a finder lens 612. The main mirror 607 may be a semitransparent mirror, and the light transmitted through the main mirror is reflected from a sub-mirror 608 toward an AF (autofocusing) unit 613. This reflected light may be used for distance measurement. The main mirror 607 is supported by a main mirror holder 640 with an adhesive or the like. When the subject is photographed, the main mirror 607 and the sub-mirror 608 are moved outside the optical path by a driving mechanism (not shown), and the shutter 609 is opened to form an image of photographing light coming through the lens barrel 601 on an imaging element 610. Also, a diaphragm 606 is provided. The diaphragm is operable to adjust brightness for photographing and the depth of focus by varying the aperture area thereof.

EXAMPLES

The optical element disclosed herein will be described more specifically with reference to the following Examples.

Preparation of Resin Composition

First, a resin composition to be cured into a cured product was prepared.

Example 1

A dispersion liquid (30.893 g) in which zirconium oxide is dispersed in methanol (produced by Sakai Chemical Industry) was prepared. The average particle size of the inorganic particles in the dispersion liquid was 5 nm, and the zirconium oxide content was 31.422 parts by mass. Also, 1.691 g of ω-carboxypolycaprolactone monoacrylate (M-5300, produced by Toagosei) was prepared as the dispersant. Tri(2-acryloxyethyl) isocyanurate (2.952 g), pentaerythritol triacrylate (0.510 g), and dicyclopentenyloxyethyl methacrylate (4.154 g) were prepared as the UV-curable resin. Furthermore, 0.236 g of 1-hydroxycyclohexyl phenyl ketone was prepared as a photopolymerization initiator. The constituents were mixed in a bottle.

The mixture was subjected to ultrasonic cleaning with an ultrasonic cleaning device BRANSON 1210 (available from Emerson Japan) for 30 minutes and subsequently to filtration through a syringe filters (PTFE, 0.8 μm and 0.2 μm in pore size) to remove aggregates. Then, the resulting mixture was concentrated under reduced pressure with an evaporator while being heated in an oil bath of 41° C. Thus, the solvent, or methanol, was removed to yield a resin composition to be cured into a cured product of Example 1.

Table 1 shows the weights of the dispersion liquid, the dispersant, the curable resin (monomers), and the polymerization initiator in the mixture.

TABLE 1

|  | Material | Unit | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| Dispersion liquid | A1 | g | 30.893 | 30.893 | 30.776 | 31.011 |  | 30.893 | 30.893 | 30.893 | 31.422 | 23.778 |
|  | A2 | g |  |  |  |  | 15.996 |  |  |  |  |  |
| Dispersant | B1 | g | 1.691 | 1.691 | 1.267 | 2.118 | 2.551 | 1.691 |  | 1.691 | 1.691 | 1.302 |
|  | B2 | g |  |  |  |  |  |  | 1.691 |  |  |  |
| Curable resin | C1 | g | 2.952 | 2.120 | 2.245 | 1.994 | 3.398 | 2.120 | 2.120 |  | 6.203 | 8.627 |
|  | C2 | g | 0.510 | 1.335 | 1.414 | 1.256 | 2.139 |  | 1.335 |  | 1.413 | 1.704 |
|  | C3 | g | 4.154 | 4.162 | 4.407 | 3.915 | 6.669 | 4.162 | 4.162 | 4.162 |  |  |
|  | C4 | g |  |  |  |  |  | 1.335 |  |  |  |  |
|  | C5 | g |  |  |  |  |  |  |  | 3.455 |  |  |
| Polymerizable initiator | D1 | g | 0.236 | 0.236 | 0.249 | 0.222 | 0.378 | 0.236 | 0.236 | 0.236 | 0.236 | 0.320 |

|  | Material | Unit | Comparative Example 1 | Comparative Example 2 |
|---|---|---|---|---|
| Dispersion liquid | A1 | g | 31.287 | 30.669 |
|  | A2 | g |  |  |
| Dispersant | B1 | g | 3.120 | 0.877 |
|  | B2 | g |  |  |
| Curable resin | C1 | g | 1.698 | 2.360 |
|  | C2 | g | 1.069 | 1.486 |
|  | C3 | g | 3.334 | 4.633 |
|  | C4 | g |  |  |
|  | C5 | g |  |  |
| Polymerizable initiator | D1 | g | 0.189 | 0.262 |

The alphanumeric characters in Table 1 represent the following materials.

Dispersion Liquid

A1: zirconium oxide (inorganic particles, average particle size of 5 nm) dispersed in methanol (solvent) A2: silicon oxide (inorganic particles, average particle size of 12 nm) dispersed in methanol (solvent)

Dispersant

B1: ω-Carboxypolycaprolactone monoacrylate

B2: β-Carboxyethyl acrylate

Curable Resin

C1: Tri(2-acryloxyethyl) isocyanurate (number of polymerizable reactive groups: N=3, molecular weight: 375 (within the range of 71×N (213) to 160×N (480)), number of hydroxy groups: 0)

C2: Pentaerythritol triacrylate (number of polymerizable reactive groups: N=3, molecular weight: 298 (within the range of 71×N (213) to 160×N (480)), number of hydroxy groups: 1)

C3: Dicyclopentenyloxyethyl methacrylate (number of polymerizable reactive groups: N=1, molecular weight: 298 (within the range of 71×1 (71) to 160×1 (160), number of hydroxy groups: 0)

C4: 2-Hydroxy-3-acryloyloxypropyl methacrylate (number of polymerizable reactive groups: N=2, molecular weight: 241 (within the range of 71×N (142) to 160×N (320)), number of hydroxy groups: 1)

C5: EO-modified trimethylolpropane triacrylate (number of polymerizable reactive groups: N=3, molecular weight: 692 (within the range of 71×N (213) to 160×N (480)), number of hydroxy groups: 0)

Polymerization Initiator

D1: 1-Hydroxycyclohexyl Phenyl Ketone

Tri(2-acryloxyethyl) isocyanurate (2.120 g), pentaerythritol triacrylate (1.335 g), and dicyclopentenyloxyethyl methacrylate (4.162 g) were mixed as the curable resin. Except for this, a resin composition was prepared under the same conditions as in Example 1.

The percentages of the inorganic particles, the dispersant, the monomers, and the monomer having a hydroxy group in the cured product that would be formed by curing the resin composition were calculated relative to the volume of the cured product under the same conditions as in Example 1.

Example 3

The dispersion liquid (30.776 g) and the dispersant (1.267 g) were prepared. Also, tri(2-acryloxyethyl) isocyanurate (2.245 g), pentaerythritol triacrylate (1.414 g), and dicyclopentenyloxyethyl methacrylate (4.407 g) were mixed as the curable resin. The weight of 1-hydroxycyclohexyl phenyl ketone added as a photopolymerization initiator was changed to 0.249 g. Except for such points, a resin composition was prepared under the same conditions as in Example 1.

The percentages of the inorganic particles, the dispersant, the monomers, and the monomer having a hydroxy group in the cured product that would be formed by curing the resin composition were calculated relative to the volume of the cured product under the same conditions as in Example 1.

Example 4

The dispersion liquid (31.011 g) and the dispersant (2.118 g) were prepared. Also, tri(2-acryloxyethyl) isocyanurate (1.994 g), pentaerythritol triacrylate (1.256 g), and dicyclopentenyloxyethyl methacrylate (3.915 g) were mixed as the curable resin. The weight of 1-hydroxycyclohexyl phenyl ketone added as a photopolymerization initiator was changed to 0.222 g. Except for such points, a resin composition was prepared under the same conditions as in Example 1.

The percentages of the inorganic particles, the dispersant, the monomers, and the monomer having a hydroxy group in the cured product that would be formed by curing the resin composition were calculated relative to the volume of the cured product under the same conditions as in Example 1.

Example 5

A dispersion liquid (15.996 g) in which silicon oxide is dispersed in methanol (produced by Nissan Chemical Industries) and the dispersant (2.551 g) were prepared. The average particle size of the inorganic particles in the dispersion liquid was 12 nm, and the silicon oxide content was 29.529 parts by mass. Also, tri(2-acryloxyethyl) isocyanurate (3.398 g), pentaerythritol triacrylate (2.139 g), and dicyclopentenyloxyethyl methacrylate (6.669 g) were mixed as the curable resin. The weight of 1-hydroxycyclohexyl phenyl ketone added as a photopolymerization initiator was changed to 0.378 g. Except for such points, a resin composition was prepared under the same conditions as in Example 1.

The percentages of the inorganic particles, the dispersant, the monomers, and the monomer having a hydroxy group in the cured product that would be formed by curing the resin composition were calculated relative to the volume of the cured product. For the calculation, the specific gravities of silicon oxide, the dispersant, and the resin after curing were used.

Example 6

One of the curable resins, pentaerythritol triacrylate, was replaced with 1.335 g of 2-hydroxy-3-acryloyloxypropyl methacrylate. Except for this, a resin composition was prepared under the same conditions as in Example 2.

The percentages of the inorganic particles, the dispersant, the monomers, and the monomer having a hydroxy group in the cured product that would be formed by curing the resin composition were calculated relative to the volume of the cured product under the same conditions as in Example 1.

Example 7

The dispersant ω-carboxypolycaprolactone monoacrylate was replaced with 1.691 g of β-carboxyethyl acrylate. Except for this, a resin composition was prepared under the same conditions as in Example 2.

The percentages of the inorganic particles, the dispersant, the monomers, and the monomer having a hydroxy group in the cured product that would be formed by curing the resin composition were calculated relative to the volume of the cured product under the same conditions as in Example 1.

Example 8

Curable resins, tri(2-acryloxyethyl) isocyanurate and pentaerythritol acrylate, were replaced with 3.455 g of EO-modified trimethylolpropane triacrylate. Except for this, a resin composition was prepared under the same conditions as in Example 2.

The molecular weight of the EO-modified trimethylolpropane triacrylate was 692. The N-number thereof was 3 and the molecular weight was thus outside the range of 71×N to 160×N.

The percentages of the inorganic particles, the dispersant, the monomers, and the monomer having a hydroxy group in the cured product that would be formed by curing the resin composition were calculated relative to the volume of the cured product under the same conditions as in Example 1.

Example 9

The weight of the dispersion liquid was 31.422 g. Also, tri(2-acryloxyethyl) isocyanurate (6.203 g) and pentaerythritol triacrylate (1.413 g) were mixed as the curable resin. Except for such points, a resin composition was prepared under the same conditions as in Example 1.

The percentages of the inorganic particles, the dispersant, the monomers, and the monomer having a hydroxy group in the cured product that would be formed by curing the resin composition were calculated relative to the volume of the cured product under the same conditions as in Example 1.

Example 10

The dispersion liquid (23.778 g) and the dispersant (1.302 g) were prepared. Also, tri(2-acryloxyethyl) isocyanurate (8.627 g) and pentaerythritol triacrylate (1.704 g) were mixed as the curable resin. The weight of 1-hydroxycyclohexyl phenyl ketone added as a photopolymerization initiator was changed to 0.320 g. Except for such points, a resin composition was prepared under the same conditions as in Example 1.

The percentages of the inorganic particles, the dispersant, the monomers, and the monomer having a hydroxy group in the cured product that would be formed by curing the resin composition were calculated relative to the volume of the cured product under the same conditions as in Example 1.

Comparative Example 1

The dispersion liquid (31.287 g) and the dispersant (3.120 g) were prepared. Also, tri(2-acryloxyethyl) isocyanurate (1.698 g), pentaerythritol triacrylate (1.069 g), and dicyclopentenyloxyethyl methacrylate (3.334 g) were mixed as the curable resin. The weight of 1-hydroxycyclohexyl phenyl ketone added as a photopolymerization initiator was changed to 0.189 g. Except for such points, a resin composition was prepared under the same conditions as in Example 1.

The percentages of the inorganic particles, the dispersant, the monomers, and the monomer having a hydroxy group in the cured product that would be formed by curing the resin composition were calculated relative to the volume of the cured product under the same conditions as in Example 1.

Comparative Example 2

The dispersion liquid (30.669 g) and the dispersant (0.877 g) were prepared. Also, tri(2-acryloxyethyl) isocyanurate (2.360 g), pentaerythritol triacrylate (1.486 g), and dicyclopentenyloxyethyl methacrylate (4.633 g) were mixed as the curable resin. The weight of 1-hydroxycyclohexyl phenyl ketone added as a photopolymerization initiator was changed to 0.362 g. Except for such points, a resin composition was prepared under the same conditions as in Example 1.

The percentages of the inorganic particles, the dispersant, the monomers, and the monomer having a hydroxy group in the cured product that would be formed by curing the resin composition were calculated relative to the volume of the cured product under the same conditions as in Example 1.

Evaluation of Resin Compositions and Cured Products
Composition of Cured Products The percentages of the inorganic particles, the dispersant, the monomers, and the monomer having a hydroxy group were calculated relative to 100 parts by volume of the cured product that would be formed by curing the resin composition. Cured products were produced by a method of producing optical elements for scattering measurement. Before calculation, the specific gravity and the volume of the cured product were measured with a direct reading density measuring system using a density gradient tube method. Then, the cured products were heated to 600° C. with a thermal gravimetric analyzer TGA Q500 (manufactured by TA Instruments), and the volume percentage of the inorganic particles was calculated from the residual amount of the cured product and the specific gravity (6.02) of the inorganic particles. The specific gravity of zirconium oxide is 6.02. The specific gravity of silicon oxide is 2.00. Subsequently, the volume percentages of the dispersant and the resins were calculated from the values of the residue, the specific gravity (1.05) of the dispersant, and the specific gravity (1.28) of the cured curable resin.

Table 2 shows the volume percentages of the inorganic particles, the dispersant, the monomers, and the monomer having a hydroxy group in the cured product.

Residual Solvent

The residual solvent content in the resin compositions of Examples 1 to 10 and Comparative Examples 1 and 2 was measured by gas chromatography (using 5890 series II manufactured by Hewlett Packard). The results are shown in Table 3.

Production of Optical Elements for Refractive Index and Scattering Measurements

Optical elements for scattering measurement were produced as described below.

Figure 5A:
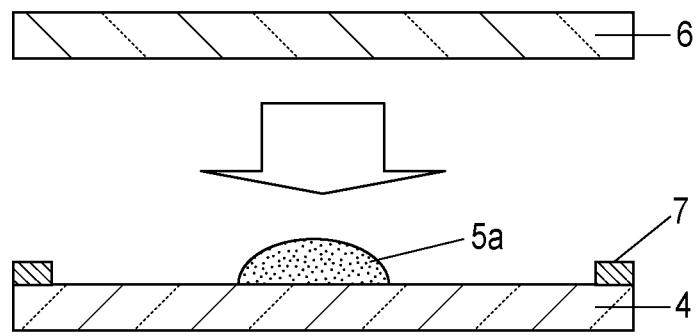
FIGS. 5A to 5D are illustrative schematic representations of a process for producing an optical element for refractive index and light scattering measurements, including the cured product disclosed herein to be subjected to the measurements.
Figure 5B:
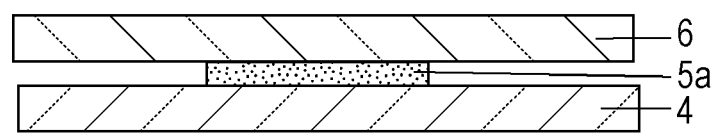
Figure 5C:
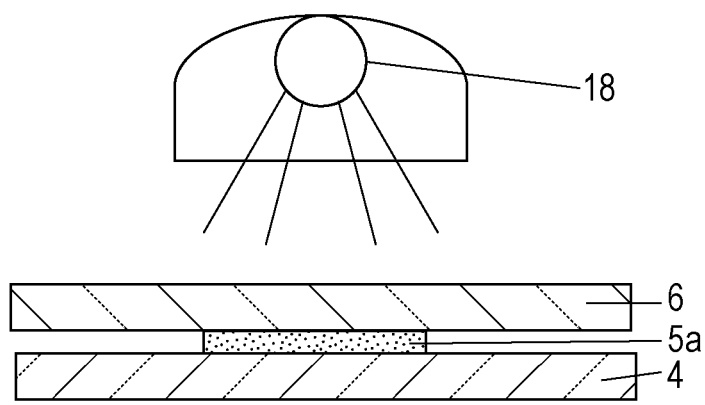

As shown in FIG. 5A, a 500 μm-thick spacer 7 and the uncured resin composition 5a of any one of the Examples and Comparative Examples were placed on a 1 mm-thick BK 7 glass plate 4. A 1 mm-thick quartz glass plate 6 was placed on the uncured resin composition 5a with the spacer 7 therebetween and was pressed on the uncured resin composition 5a to spread the composition. Subsequently, the spacer 7 was removed as shown in FIG. 5B. Then, the resin composition was irradiated with light emitted from a light source 18, high-pressure mercury-vapor lamp UL 750 (manufactured by HOYA CANDEO OPTRONICS), disposed over the quartz glass 6 at 20 mW/cm² (illuminance of light that had passed through the quartz glass) for 2500 s under the 50 J conditions, as shown in FIG. 5C. The resin composition 5a was thus cured and, after removing the quartz glass, was annealed at 80° C. for 72 hours to yield an optical element for measuring the refractive index and scattering thereof.

Figure 5D:
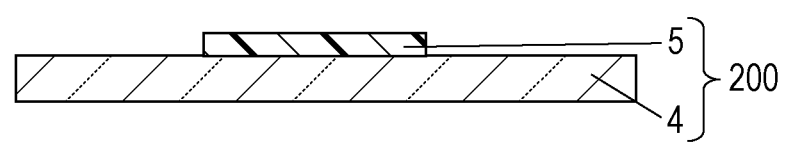

FIG. 5D shows the optical element 200 that will be subjected to measurement of refractive index and scattering.

Measurements of Refractive Index and Wavelength-Dependent Dispersion

The refractive index and the wavelength-dependent dispersion of the optical elements were determined by measuring the refractive indices for ng, $n_F$, nd, and $n_C$. The results are shown in Table 3.

Measurement of Scattering

The degree of scattering of light having a wavelength of 400 nm by the optical elements was measured by using a spectrophotometer U4000 (manufactured by Hitachi). The thickness of the resin portion of the sample was measured, and the measured degree of scattering was converted to a value for a thickness of 500 μm. The results are shown in Table 3.

Preparation of Hydroscopic Expansion Measurement Samples

Optical elements for hydroscopic expansion measurement were produced as described below.

Figure 6A:
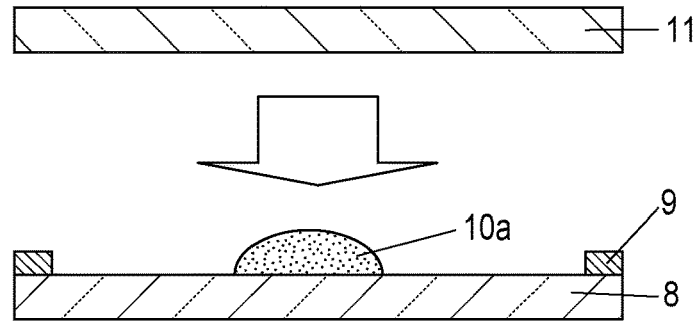
FIGS. 6A to 6D are illustrative schematic representations of a process for producing an optical element for hygroscopic expansion measurement, including the cured product disclosed herein to be subjected to the measurement.
Figure 6B:
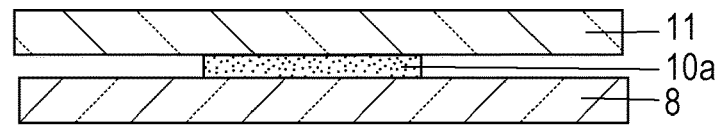
Figure 6C:
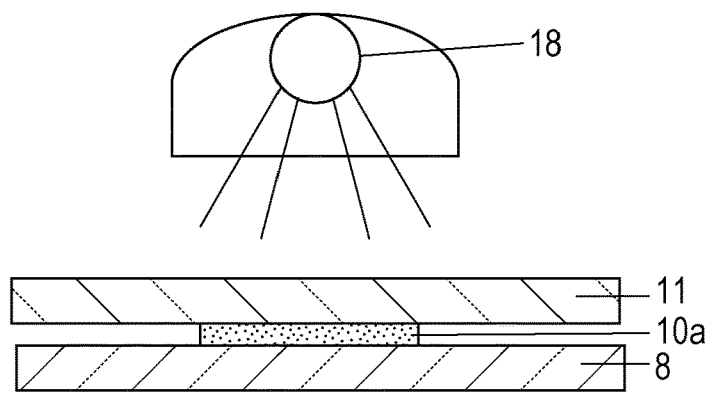

As shown in FIG. 6A, a 100 μm-thick spacer 9 and the uncured resin composition 10a of any one of the Examples and Comparative Examples were placed on a 1 mm-thick quartz glass plate 8. A 1 mm-thick quartz glass plate 11 was placed on the uncured resin composition 10a with the spacer 9 therebetween and was pressed on the uncured resin composition 5a to spread the composition. Subsequently, the spacer 9 was removed as shown in FIG. 6B. Then, the resin composition was irradiated with light emitted from a light source 18, high-pressure mercury-vapor lamp UL 750 (manufactured by HOYA CANDEO OPTRONICS), at 20 mW/cm$^2$ (illuminance of light that had passed through the quartz glass) for 2500 s under the 50 J conditions, as shown in FIG. 6C. After the resin composition 10a was thus cured, the quartz glass plates were removed from the respective sides. The resulting cured resin film was worked into a 5 mm×20 mm rectangular shape and was then subjected to annealing at 80° C. for 72 hours to yield a hygroscopic expansion measurement sample.

Figure 6D:
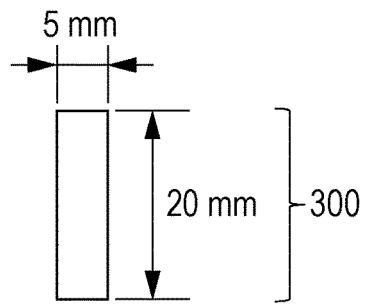

The hydroscopic expansion measurement sample 300 is shown in FIG. 6D.

Measurement of Hydroscopic Expansion Measurement Samples

The hydroscopic expansion of each sample was measured with a water vapor atmosphere-specified thermomechanical analyzer HUM-TMA with Thermo Plus EVO (each manufactured by Rigaku. The length of the sample was measured at 60° C. and a humidity of 70% and at 60° C. and a humidity of 0%, and the percentage of the change in length relative to the original length was calculated from the difference between the measurements. The results are shown in Table 3.

TABLE 2

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| Inorganic particles | 16.1% | 16.1% | 16.1% | 16.1% | 16.1% | 16.1% | 16.1% | 16.1% | 16.1% | 11.0% |
| Dispersant | 15.6% | 15.6% | 11.7% | 19.4% | 16.0% | 15.6% | 15.6% | 15.6% | 15.6% | 10.6% |
| Monomers | 27.0% | 27.0% | 28.7% | 25.2% | 29.4% | 27.0% | 27.0% | 26.9% | 59.3% | 71.3% |
| Hydroxy-containing monomer | 4.0% | 10.5% | 11.1% | 9.7% | 11.4% | 10.5% | 10.5% | 0.0% | 11.0% | 11.8% |

|  | Comparative Example 1 | Comparative Example 2 |
|---|---|---|
| Inorganic particles | 16.1% | 16.1% |
| Dispersant | 28.4% | 8.1% |
| Monomers | 21.3% | 30.2% |
| Hydroxy-containing monomer | 8.2% | 11.7% |

Example 2

TABLE 3

|  | Unit | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Residual solvent | mass % | ≥0.005 | ≥0.005 | ≥0.005 | ≥0.005 | ≥0.005 | ≥0.005 | ≥0.005 | ≥0.005 | ≥0.005 | ≥0.005 |
| Refractive index nd |  | 1.62 | 1.62 | 1.62 | 1.62 | 1.52 | 1.62 | 1.62 | 1.62 | 1.62 | 1.59 |
| Abbe number vd |  | 45.0 | 44.9 | 44.9 | 44.9 | 52.0 | 44.9 | 44.9 | 44.9 | 44.8 | 46.4 |
| Wavelength dispersion θgF |  | 0.57 | 0.57 | 0.57 | 0.57 | 0.52 | 0.57 | 0.57 | 0.57 | 0.57 | 0.57 |
| Scattering rate | % | 1.4% | 1.1% | 1.2% | 1.0% | 0.5% | 1.1% | 1.5% | 1.5% | 1.2% | 1.2% |
| Hydroscopic expansion | % | 0.35 | 0.36 | 0.33 | 0.39 | 0.33 | 0.38 | 0.37 | 0.42 | 0.31 | 0.3 |

|  | Unit | Comparative Example 1 | Comparative Example 2 |
|---|---|---|---|
| Residual solvent | mass % | ≥0.005 | ≥0.005 |
| Refractive index nd |  | 1.62 | 1.62 |
| Abbe number vd |  | 44.9 | 44.9 |
| Wavelength dispersion θgF |  | 0.57 | 0.57 |
| Scattering rate | % | 0.9% | 1.8% |
| Hydroscopic expansion | % | 0.47 | 0.30 |

Tables 2 and 3 show that the samples of Examples 1 to 10, in which the dispersant accounted for 10 parts 20 parts of the volume of the cured product, exhibited a scattering of 1.5% or less and a hygroscopic expansion of 0.42% or less.

In contrast, Comparative Example 1, in which the dispersant accounted for a larger part than in Examples 1 to 10, that is, 28.4 parts, of the volume of the cured product, exhibited as large a hygroscopic expansion as 0.47%. Also, Comparative Example 2, in which the dispersant accounted for a smaller part than in Examples 1 to 10, that is, 8.1 parts, of the volume of the cured product, exhibited as large a scattering as 1.8%.

The hydroscopic expansion in Example 8 was slightly larger than that in Examples 1 to 7, 9, and 10. This is probably because the EO-modified trimethylolpropane triacrylate used in Example 8 had a molecular weight of 692 (N=3), which was outside the range of 71×N to 160×N.

Diffractive Optical Elements

Diffractive optical elements as shown in FIG. 3 were produced in the process shown in FIGS. 4A to 4D.

First, a resin composition was prepared for forming the first resin layer.

A dispersion liquid (51.63 g) in which indium tin oxide (ITO) is dispersed in xylene (produced by CIK Nanotech) was prepared. The average particle size of the inorganic particles in the dispersion liquid was 20 nm, and the dispersion liquid contains 9.96 parts by mass of indium tin oxide, 2.19 parts by mass of a polymeric dispersant. Also, 3.72 g of a mixture of curable resins was prepared. The mixture contained 20 parts by mass of tri(2-acryloxyehyl) isocyanurate, 25 parts by mass of pentaerythritol triacrylate, 40 parts by mass of dicyclopentenyloxyethyl methacrylate, 13 parts by mass of urethane-modified polyester acrylate, and 2 parts by mass of 1-hydroxycyclohexyl phenyl ketone. The dispersion liquid and the curable resin mixture was mixed.

The resulting mixture was subjected to evaporation in an evaporator such a manner that the pressure was gradually reduced from 300 hPa to 2 hPa and finally to 4 hPa while the temperature of the mixture was heated in an oil bath of 41° C. The mixture was subjected to such pressure changes over a period of 40 hours to yield a resin composition used for forming the first resin layer.

Subsequently, the residual solvent content in the first resin composition and the refractive index of the first resin composition were measured in the same manner as in the case of the cured product. The residual solvent content was 0.002 parts by mass. The refractive index nd, the Abbe number vd, and the wavelength-dependent dispersion θgF were 1.567, 19.0, and 0.41, respectively. This implies that the first resin layer exhibits smaller refraction and larger dispersion than the second resin layer.

Next, diffractive optical elements were produced by using the resin composition for the first resin layer and the resin composition of any one of Examples 1 to 4 and 6 to 10 and Comparative Example 1.

First, the resin composition 900a for the first resin layer was applied onto the mold 12 having a shape of a diffraction grating, and a 2 mm-thick glass plate acting as the first substrate 700 was placed on the resin composition 900a, as shown in FIG. 4A. Subsequently, the composition was irradiated with light emitted from a light source, high-pressure mercury-vapor lamp EXECURE 250 (manufactured by HOYA CANDEO OPTRONICS) (not shown), at an intensity of 14.2 mW/cm² to 20 mW/cm² for 600 s to 850 s. After the resin composition 900a was cured, the mold 12 was removed as shown in FIG. 4B, and the cured resin was subjected to annealing in the atmosphere at 80° C. for 72 hours to yield a first resin layer 900.

Then, the first substrate 700 having the first resin layer 900 was held by a forming jig 16, as shown in FIG. 4C. Subsequently, the resin composition 910a of any one of Examples 1 to 4 and 6 to 10 and Comparative Example 1 was dropped onto the shape of the diffraction grating of the first resin layer 900 from a dispenser (not shown).

Then, a flat glass plate acting as the second substrate 800 was placed on the resin composition 910a, as shown in FIG. 4D, and pressed on the resin composition 910a to spread the resin composition so that the distance from the edge of the first resin layer in the radial direction to the edge of the resin composition was 300 µm. The resulting sample was irradiated with light emitted from a light source 18, high-pressure mercury-vapor lamp UL 750 (manufactured by HOYA CANDEO OPTRONICS), at 20 mW/cm² (illuminance of light that had passed through the quartz glass) for 2500 s under the 50 J conditions. After the resin composition 910a was cured, the sample was subjected to annealing at 80° C. for 72 hours to yield a diffractive optical element 1000.

Evaluation

Evaluation of Diffraction Efficiency

The diffractive optical element 1000 was irradiated with spot light, and the total amount of transmitted light was measured with a light-receiving portion in tight contact with the element. Then, the amount of a design-order light (first-order diffracted light) was measured, and the ratio of the amount of the design-order light to the total amount of transmitted light was calculated as the diffraction efficiency.

Height-Temperature, High-Humidity Test

The diffractive optical element 1000 was placed in a thermostatic bath in which the environment was set to a temperature of 60° C. and a humidity of 70%. After 2000 hours, the sample was removed from the thermostatic bath, and the transmitted wave front was measured with a Fizeau interferometer GPI (manufactured by (Zygo). The transmitted wave front is information including optical shapes represented by, for example, couverture and optical properties, such as refractive index. The obtained transmitted wave front was fitted, and the peak-valley (PV) value was read from the phase section of the transmitted wave front taken along a line passing through the center of the lens. The changes between the transmitted wave fronts before and after high-temperature high-humidity durability test were analyzed as changes at an edge.

Samples whose transmitted wave front was changed by 200 nm or more by the high-temperature, high-humidity test were rated as B, and samples whose transmitted wave front was changed by 200 nm or less were rated as A.

Also, samples that produced photographed images notably varied before and after the high-temperature high-humidity test were rated as B, and samples that produced photographed images having a small difference were rated as A.

TABLE 4

|  | Unit | Example 1 | Example 2 | Example 3 | Example 4 | Example 6 | Example 7 | Example 8 | Example 9 |
|---|---|---|---|---|---|---|---|---|---|
| Diffraction Efficiency | % | ≥99.5 | ≥99.5 | ≥99.5 | ≥99.5 | ≥99.5 | ≥99.5 | ≥99.5 | ≥99.5 |
| Transmitted wave front change |  | A | A | A | A | A | A | A | A |
| Photographed image degradation |  | A | A | A | A | A | A | A | A |

|  | Unit | Example 10 | Comparative Example 1 |
|---|---|---|---|
| Diffraction Efficiency | % | ≥99.5 | ≥99.5 |
| Transmitted wave front change |  | A | B |
| Photographed image degradation |  | A | B |

The sample using the resin composition of Comparative Example 1, whose hydroscopic expansion was large, exhibited as a large change as 205 nm between the transmitted wave fronts before and after the high-temperature high-humidity test, and accordingly, the photographed images were considerably degraded. Also, when the edge of the first resin layer 910 of the diffractive optical element using the resin composition of Comparative Example 1 was observed by microscopy, the first resin layer was expanded in the radial direction.

In the cured product disclosed herein, the inorganic particles were favorably dispersed by the presence of the dispersion, and the curable resin contains at least one monomer having at least two polymerizable reactive groups. Thus, the crosslinked structure formed by curing the monomer(s) suppresses hygroscopic expansion of the resulting cured product. Accordingly, the cured product maintains high optical properties thereof even in a high-temperature high-humidity environment.

Second Embodiment

The cured product according to a second embodiment does not much scatter light and is thus suitable for optical use. The cured product of the second embodiment contains a dispersant, inorganic particles, and a resin that is a product of polymerization or copolymerization of a curable resin, as with the cured product of the first embodiment, and further contains acetic acid.

The curable resin, the inorganic particles, the dispersant, the dispersion solvent, and the polymerization initiator used in the cured product of the second embodiment are the same as those used in the first embodiment. Therefore, different points from the first embodiment will be described below.

Acetic Acid

The acetic acid in the cured product of the present embodiment is adsorbed onto the surfaces of the inorganic particles, thus acting as a stabilizing agent to chemically stabilize the surfaces of the inorganic particles. The acetic acid thus helps the dispersant suppress aggregation of the inorganic particles.

The acetic acid content may be 3.5 parts by volume to 15.0 parts by volume relative to 100 parts by volume of the cured product. When the acetic acid content is in such a range, the dispersant can suppress aggregation of the inorganic particles effectively. In contrast, when the acetic acid content is less than 3.5 parts by volume, aggregation of the inorganic particles is not sufficiently suppressed, and a portion of the inorganic particles is likely to form aggregates causing light scattering. Also, when the acetic acid content exceeds 15.0 parts by volume, the acid may cause hydrolysis or generate heat, deteriorating the resin composition.

Acetic acid may be added to the resin composition that is the raw material of the cured product by any technique without particular limitation. It may be added into the raw material during the manufacturing process, or a raw material containing acetic acid may be prepared. The acetic acid content may be controlled to a desired level through purification, concentration, or the like. The acetic acid content in the resulting resin may be determined by, for example, gas chromatography.

EXAMPLES

The resin composition, the optical element, and the diffractive optical element according to the present embodiment will be described more specifically with reference to the following Examples.

Preparation of Resin Composition

Example 11

In 233 parts by mass of methanol were dispersed 100 parts by mass of zirconium oxide particles (number average particle size: 3 nm) with 17.4 parts by mass of dispersant ω-carboxypolycaprolactone monoacrylate and 11.2 parts by mass of acetic acid as a stabilizing agent. In the resulting dispersion liquid were dissolved 20.3 parts by mass of tris(2-acryloyloxyethyl) isocyanurate, 39.6 parts by mass of pentaerythritol triacrylate, 13.0 parts by mass of dicyclopentenyloxyethyl acrylate, and 2.4 parts by mass of photopolymerization initiator 1-hydroxycyclohexyl phenyl ketone. Then, the resulting solution was concentrated at 40° C. under reduced pressure with an evaporator while being heated in an oil bath. Thus, methanol was removed to yield a resin composition of Example 11.

Next, the percentages of the inorganic particles and acetic acid were calculated relative to 100 parts by volume of the cured product that would be formed by curing the resin composition. For the calculation, the specific gravities of zirconium oxide, the dispersant, acetic acid, and the resin after curing were used. The zirconium oxide accounted for 16.3 parts of the volume of the cured product; the dispersant (ω-carboxypolycaprolactone monoacrylate) accounted for 15.7 parts of the volume of the cured product; and acetic acid accounted for 10.5 parts of the volume of the cured product.

Example 12

A resin composition of Example 12 was prepared in the same manner as in Example 11, except for changing the amount of acetic acid to 8.2 parts by mass, the amount of tris(2-acryloyloxyethyl) isocyanurate to 21.1 parts by mass, the amount of pentaerythritol triacrylate to 41.2 parts by mass, the amount of dicyclopentenyloxyethyl acrylate to 13.5 parts by mass, and the amount of photopolymerization initiator 1-hydroxycyclohexyl phenyl ketone to 2.5 parts by mass.

Subsequently, the percentage of the inorganic particles and the acetic acid were calculated relative to 100 parts by volume of the cured product in the same manner as in Example 11. The zirconium oxide accounted for 16.4 parts of the volume of the cured product; the dispersant (ω-carboxypolycaprolactone monoacrylate) accounted for 15.8 parts of the volume of the cured product; and acetic acid accounted for 7.7 parts of the volume of the cured product.

Example 13

A resin composition of Example 13 was prepared in the same manner as in Example 11, except for changing the amount of acetic acid to 4.2 parts by mass, the amount of tris(2-acryloyloxyethyl) isocyanurate to 22.2 parts by mass, the amount of pentaerythritol triacrylate to 43.6 parts by mass, the amount of dicyclopentenyloxyethyl acrylate to 14.0 parts by mass, and the amount of photopolymerization initiator 1-hydroxycyclohexyl phenyl ketone to 2.5 parts by mass.

Subsequently, the percentage of the inorganic particles and the acetic acid were calculated relative to 100 parts by volume of the cured product in the same manner as in Example 11. The zirconium oxide accounted for 16.5 parts of the volume of the cured product; the dispersant (ω-carboxypolycaprolactone monoacrylate) accounted for 15.9 parts of the volume of the cured product; and acetic acid accounted for 4.0 parts of the volume of the cured product.

Example 14

A resin composition of Example 14 was prepared in the same manner as in Example 11, except for changing the amount of acetic acid to 15.1 parts by mass, the amount of tris(2-acryloyloxyethyl) isocyanurate to 19.3 parts by mass, the amount of pentaerythritol triacrylate to 37.8 parts by mass, the amount of dicyclopentenyloxyethyl acrylate to 12.1 parts by mass, and the amount of photopolymerization initiator 1-hydroxycyclohexyl phenyl ketone to 2.1 parts by mass.

Subsequently, the percentage of the inorganic particles and the acetic acid were calculated relative to 100 parts by volume of the cured product in the same manner as in Example 11. The zirconium oxide accounted for 16.2 parts of the volume of the cured product; the dispersant (ω-carboxypolycaprolactone monoacrylate) accounted for 15.6 parts of the volume of the cured product; and acetic acid accounted for 14.0 parts of the volume of the cured product.

Comparative Example 3

A resin composition of Comparative Example 3 was prepared in the same manner as in Example 11, except for changing the amount of acetic acid to 3.7 parts by mass, the amount of tris(2-acryloyloxyethyl) isocyanurate to 22.3 parts by mass, the amount of pentaerythritol triacrylate to 43.6 parts by mass, the amount of dicyclopentenyloxyethyl acrylate to 14.3 parts by mass, and the amount of photopolymerization initiator 1-hydroxycyclohexyl phenyl ketone to 2.7 parts by mass.

Subsequently, the percentage of the inorganic particles and the acetic acid were calculated relative to 100 parts by volume of the cured product in the same manner as in Example 11. The zirconium oxide accounted for 16.5 parts of the volume of the cured product; the dispersant (ω-carboxypolycaprolactone monoacrylate) accounted for 15.9 parts of the volume of the cured product; and acetic acid accounted for 3.5 parts of the volume of the cured product.

Comparative Example 4

A resin composition of Comparative Example 4 was prepared in the same manner as in Example 11, except for changing the amount of acetic acid to 17 parts by mass, the amount of tris(2-acryloyloxyethyl) isocyanurate to 18.8 parts by mass, the amount of pentaerythritol triacrylate to 36.8 parts by mass, the amount of dicyclopentenyloxyethyl acrylate to 11.8 parts by mass, and the amount of photopolymerization initiator 1-hydroxycyclohexyl phenyl ketone to 2.1 parts by mass.

Subsequently, the percentage of the inorganic particles and the acetic acid were calculated relative to 100 parts by volume of the cured product in the same manner as in Example 11. The zirconium oxide accounted for 16.1 parts of the volume of the cured product; the dispersant (ω-carboxypolycaprolactone monoacrylate) accounted for 15.6 parts of the volume of the cured product; and acetic acid accounted for 15.7 parts of the volume of the cured product.

Evaluation of Resin Compositions and Cured Products
Scattering Ratio

Elements for scattering measurement were produced as described below.

A 500 μm-thick spacer was disposed on a 1 mm-thick glass substrate, and the resin composition of any one of Examples 11 and 12 and Comparative Example 3 was applied onto the glass substrate. A 1 mm-thick glass plate was placed on the resin composition and pressed on the resin composition to spread the resin composition. In this state, the resin composition was cured by being irradiated with UV light emitted from a high-pressure mercury-vapor lamp at 15 mW/cm$^2$ for 3000 s to yield an element for scattering measurement.

The total amount of light transmitted through the sample and the amount of light diffused in the sample were measured with a spectrophotometer U4000 (manufactured by Hitachi), and a ratio of the amount of diffused light to the total amount of transmitted light was calculated as the scattering ratio. The measurement results are shown in Table 5.

In Comparative Example 4, since the resin composition contained acetic acid as much as 15.2 parts by volume, the cured product deteriorated at a point of 170 hours from the point of being produced when allowed to stand at 23° C., and the element for scattering measurement was therefore not produced.

TABLE 5

|  | Scattering (%) |
| --- | --- |
| Example 11 | 1.1 |
| Example 12 | 1.1 |
| Example 13 | 1.2 |
| Example 14 | 1.1 |
| Comparative Example 3 | 1.6 |

Production of Diffractive Optical Elements

Diffractive optical elements as shown in FIG. 3 were produced in the process shown in FIGS. 4A to 4D.

First, a resin composition was prepared for forming the first resin layer.

In 126.3 g of xylene was dissolved 2.9 g of a dispersant co-carboxypolycaprolactone monoacrylate. Subsequently, 14.4 g of indium tin oxide (ITO) inorganic particles having an average particle size of 15 nm were added to the solution to yield a mixture of the dispersant and the ITO particles. The mixture was agitated in a bead mill and then filtered through a filter of 100 nm in pore size to yield a slurry containing 10 parts by mass of ITO particles dispersed in xylene.

Subsequently, 6.1 g of a photopolymerization initiator-mixed UV curable resin HV153 (produced by ADELL) was dissolved in the slurry. The resulting mixture was subjected to evaporation in an evaporator at 45° C. and gradually decreasing pressure from 100 hPa to finally 3 hPa. The mixture underwent such pressure changes over a period of 12 hours to yield a resin composition used for forming the first resin layer.

An element for scattering measurement using this resin composition was produced in the same manner as in Example 11, and the refractive index and the wavelength-dependent dispersion of the element were determined by measuring the refractive indices ng, $n_F$, nd, and $n_C$. The refractive index nd, the Abbe number vd, and the wavelength-dependent dispersion θgF were 1.57, 19.0, and 0.41, respectively.

Next, diffractive optical elements were produced by using the resin composition for the first resin layer and the resin composition of any one of Examples 11 and 12 and Comparative Example 3.

First, the resin composition 900a for the first resin layer was applied onto the mold 12 in the form of a diffraction grating. Then, a glass substrate S-FSLS (manufactured by OHARA) acting as the first substrate 700 was placed on the resin composition 900a and was then pressed on the resin composition 900a to spread the composition.

Subsequently, the resin composition 900a was cured by being irradiated with light emitted from a light source, high-pressure mercury-vapor lamp EXECURE 250 (manufactured by HOYA CANDEO OPTRONICS) (not shown), at an intensity of 20 mW/cm² for 1000 s.

After the resin composition 900a was cured, the mold 12 was removed as shown in FIG. 4B, and the cured resin was subjected to annealing in the atmosphere at 80° C. for 72 hours to yield a first resin layer 900.

Then, the first substrate 700 having the first resin layer 900 was held by a forming jig 16, as shown in FIG. 4C. Subsequently, the resin composition 910a of any one of Examples 11 and 12 and Comparative Example 3 was dropped onto the shape of the diffraction grating of the first resin layer 900 from a dispenser (not shown).

Then, a flat glass plate S-LAH55V (manufactured by OHARA) acting as a second substrate 800 was placed on the resin composition, as shown in FIG. 4D, and was pressed on the resin composition 910a to spread the resin composition.

The resin composition 910a was cured by being irradiated with light emitted from a light source 18, high-pressure mercury-vapor lamp EXECURE 250 (manufactured by HOYA CANDEO OPTRONICS), through the second substrate 800 at an intensity of 20 mW/cm² for 1000 s to yield a diffractive optical element.

In any of Examples 11 and 12 and Comparative Example 3, the refractive index nd, the Abbe number vd, and the wavelength-dependent dispersion of the cured resin of the second resin layer were 1.62, 45.0, and 0.57, respectively. This implies that the second resin layer exhibits larger refraction and small dispersion than the first resin layer.

Flare Factor of Diffractive Optical Elements

Flare caused by each element was measured with a flare meter. The flare meter includes a light source, a flare evaluation chart, an optical system into which the lens to be tested will be installed, and an imaging sensor. The flare evaluation chart includes a black body. The light source is disposed at the back of the black body. The flare evaluation chart is photographed with the imaging sensor through the optical system into which the lens to be tested is installed. The darker the photograph of the black body, the lower the flare factor; the brighter and the whiter, the higher the flare factor. It was thus measured how much flare (scattered light) spread over the photographed image of the black body. The flare factor was calculated as a ratio of the amount of flare caused by the lens tested to the amount of flare caused by a reference lens.

TABLE 6

| | Flare factor (%) |
| --- | --- |
| Example 11 | 36 |
| Example 12 | 36 |
| Example 13 | 38 |
| Example 14 | 35 |
| Comparative Example 3 | 43 |

Table 6 suggests that optical elements including a cured product containing acetic acid with a content of 3.5 parts by volume to 15.0 parts by volume relative to 100 parts by volume of the cured product exhibit small scattering. Thus, the optical element according to the second embodiment has highly transparent optical properties and can produce favorable images when used as, for example, a lens of a camera.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-093252 filed May 14, 2018, No. 2018-093253 filed May 14, 2018, and No. 2019-074992 filed Apr. 10, 2019, which are hereby incorporated by reference herein in their entirety.

What is claimed is:

1. A cured product comprising:
   10 parts by volume to 20 parts by volume of a dispersant relative to 100 parts by volume of the cured product, the dispersant containing a compound represented by a formula R—X, wherein R represents a group having an acryloyloxy group or a methacryloyloxy group at an end of the molecule thereof, and X represents a carboxy group;
   inorganic particles; and
   a resin that is a product of polymerization or copolymerization of a curable resin, the curable resin containing at least one monomer having an N number of polymerizable reactive groups, the proportion of the at least one monomer being 25 parts by volume to 76 parts by volume relative to 100 parts by volume of the cured product, wherein N represents an integer of 2 or more.

2. The cured product according to claim 1, wherein the curable resin is a (meth)acrylic resin.

3. The cured product according to claim 1, wherein the polymerizable reactive group is a (meth)acrylate group.

4. The cured product according to claim 1, wherein the at least one monomer has a molecular weight in the range of 71×N to 160×N.

5. The cured product according to claim 4, wherein the proportion of the at least one monomer is 25 parts by volume to 30 parts by volume relative to 100 parts by volume of the cured product.

6. The cured product according to claim 4, wherein the curable resin contains a monomer having a hydroxy group in a proportion of 4.0 parts by volume to 12 parts by volume relative to 100 parts by volume of the cured product.

7. The cured product according to claim 1, wherein the compound represented by the formula R—X is β-carboxyethyl acrylate or ω-carboxypolycaprolactone monoacrylate.

8. The cured product according to claim 1, wherein the inorganic particles have an average particle size of 3 nm to 20 nm.

9. The cured product according to claim 8, wherein the content of the inorganic particles is 5 parts by volume to 25 parts by volume relative to 100 parts by volume of the cured product.

10. The cured product according to claim 1, further comprising 3.5 parts by volume to 15.0 parts by volume of acetic acid relative to 100 parts by volume of the cured product.

11. A diffractive optical element comprising:
a substrate;
a first cured product over the substrate, the first cured product having a shape of a diffraction grating; and
a second cured product over the first cured product, the second cured product having a shape of a diffraction grating,
wherein one of the first cured product and the second cured product is the cured product as set forth in claim 1.

12. The diffractive optical element according to claim 11, wherein the first cured product has a refractive index nd1 and an Abbe number v1, the second cured product has a refractive index nd2 and an Abbe number v2, and the first cured product and the second cured product satisfy the relationships: nd1<nd2 and v1<v2.

13. An optical apparatus comprising:
a housing; and
an optical system including a plurality of lenses within the housing, the lenses including the diffractive optical element as set forth in claim 11.

14. An imaging apparatus comprising:
a housing;
an optical system including a plurality of lenses within the housing, the lenses including the diffractive optical element as set forth in claim 11; and
an imaging element operable to receive light that has passed through the optical system.

15. The imaging apparatus according to claim 14, wherein the imaging apparatus is a camera.

16. The cured product according to claim 1, wherein the monomer is at least one selected from the group consisting of tri(acryloyloxyethyl) isocyanurate, dipentaerythritol hexa(meth)acrylate, tetraethylene glycol diacrylate, pentaerythritol tetra(meth)acrylate, and 2-hydroxy-3-acryloyloxypropyl methacrylate.

17. The cured product according to claim 1, wherein the inorganic particles is at least one selected from the group consisting of silicon oxide, titanium oxide, strontium titanate, zirconium oxide, hafnium oxide, aluminum oxide, indium oxide, tin oxide, indium tin oxide, antimony-doped tin oxide, and zinc oxide.

18. The cured product according to claim 17, wherein the inorganic particles are zirconium oxide.

19. An optical element comprising:
a first substrate;
the cured product as set forth in claim 1; and
a second substrate on the cured product.

* * * * *